United States Patent [19]

Kottke

[11] 3,759,915

[45] Sept. 18, 1973

[54] CAULKING COMPOSITION COMPRISING POLYMER HAVING ADDITION POLYMERIZED BACKBONE HAVING CARBOXYL GROUPS ESTERIFIED WITH DRYING OIL FATTY ACID HYDROXYAMIDE

[75] Inventor: Roger H. Kottke, Doylestown, Pa.

[73] Assignee: Rohm and Haas Company, Philadelphia, Pa.

[22] Filed: Aug. 30, 1971

[21] Appl. No.: 176,338

Related U.S. Application Data

[63] Continuation-in-part of Ser. No. 81,529, Oct. 16, 1970, abandoned.

[52] U.S. Cl............................ 260/41 R, 260/78.5 T
[51] Int. Cl. ............................................ C08f 45/02
[58] Field of Search ...................... 260/41, 29.6 HN; 26/78.5 T

[56] References Cited
UNITED STATES PATENTS
3,590,016   6/1971   Hopwood.................... 260/29.6 HN FOREIGN PATENTS OR APPLICATIONS
1,940,471   2/1966   Germany
757,271     4/1971   Belgium

OTHER PUBLICATIONS

Journal of the American Oil Chemist Society Vol. 46, p. 355-364, 1969.

Chem. Abstract Vol. 58, 674 f, 1963.

Primary Examiner—Theodore Morris
Attorney—Robert A. Doherty et al.

[57] ABSTRACT

The caulking or sealing composition of the invention has as its binder an acrylic backbone containing pendant unsaturated groups, preferably derived from drying oil fatty acids, and attached to the acrylic backbone through amidoester linkages. The acrylic modified product has the flexibility and durability characteristic of acrylics, and the advantage that the composition will cure similarly to drying oils, using driers such as cobalt naphthenate and zinc naphthenate.

9 Claims, No Drawings

CAULKING COMPOSITION COMPRISING POLYMER HAVING ADDITION POLYMERIZED BACKBONE HAVING CARBOXYL GROUPS ESTERIFIED WITH DRYING OIL FATTY ACID HYDROXYAMIDE

This application is a continuation-in-part of my application Ser. No. 81,529, filed Oct. 16, 1970, now abandoned.

This invention relates to caulking, sealing, or putty compositions.

There are many types of caulking compounds including those in which the binder is such that they are surface drying. This includes drying by oxidation or by solvent release. The permanently plastic binders comprise another category. Other types of caulking compounds are those which are catalytically cured and those which are heat convertible. The disadvantage of the drying oil type, which drys by oxidation, is that the oil may bleed from the composition, before it is cured, be absorbed by porous substrates such as wood, and ultimately the drying reaction is carried to such an extent that the products become brittle and sometimes extremely hard. This makes replacement of the caulking very difficult.

The present invention provides a combination of types of cure and provides a combination of properties which could be said to be a permanently plastic product which cures by an oxidation reaction of unsaturated groups on the permanently plastic polymer, and preferably also by solvent evaporation. Basically, the product comprises an addition polymer backbone such as an acrylic backbone which has groups attached thereto through esterification of carboxyl groups on the backbone by a fatty acid hydroxyamide, the fatty acid having an unsaturated group curable by a drying or oxidative mechanism. The binder for the caulking compound has units of the following structure:

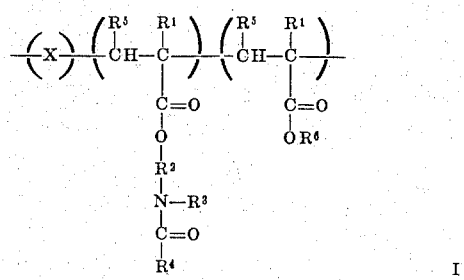

I wherein $R^1$ is H, a lower alkyl radical of up to about five carbon atoms, such as methyl or butyl, or less preferably, halogen, $-CH_2COOR$, $-COOR$, or $-CH_2COOH$, R being a lower alkyl radical of from one to eight carbon atoms;

$R^2$ is a branched or straight chain alkylene radical having from 2 to 18, preferably two to three linear carbon atoms between the nitrogen and oxygen atoms, examples being propylene, ethylene, and decamethylene;

$R^3$ is H, or a lower alkyl radical having from one to 8 carbon atoms; examples being methyl, hexyl, and octyl;

$R^4$ is an unsaturated air curable alkyl radical, having from about 10 to about 22 carbon atoms;

$R^5$ is H, $-COOH$, $-CONH_2$, or $-COOR$, wherein R is as above;

$R^6$ is at least one of H and one or more lower alkyl radicals having from one to 8 carbon atoms, examples being methyl, hexyl, and octyl, at least a portion of $R^6$ being H to give free carboxyl groups; and X is derived from at least one other optional copolymerizable vinyl monomer (defined hereinbelow) other than the one or ones from which the right hand parenthetical group

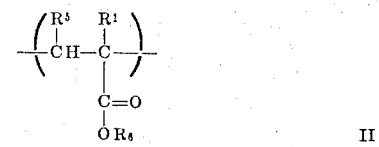

II is derived. It is to be understood that when $R^1$ and/or $R^5$ contain free carboxyl groups ($-COOH$), the hydroxy amide will react therewith to give pendant ester groups equivalent to the structure of formula V, below.

The units in parentheses are in any order.

Examples of $R^1$ and $R^5$ are:

| $R^1$ | $R^5$ | Acid for Carboxyl Source |
|---|---|---|
| H | H | acrylic |
| $CH_3$ | H | methacrylic |
| H | COOH | maleic, fumaric |
| H | $CONH_2$ | maleamic |
| Cl | COOH | chloromaleic |
| $CH_2COOCH_3$ | H | methyl acid itaconate |
| $CH_2COOH$ | H | itaconic |
| $CH_2COOH$ | COOH | aconitic |
| H | $COOCH_3$ | half ester of maleic |

The matter in the right-hand parenthetical group, of course, represents that portion of the addition polymerized polymer backbone having free carboxyl groups as well as carboxyl groups which are esterified by the various alcohols conventionally used. The optional portion $-X-$, is derived from any of the well-known unsaturated addition polymerizable vinyl monomers, defined below, in addition to those which give units of formula II, above.

The backbone polymer, before esterification by the hydroxyamide, has the formula

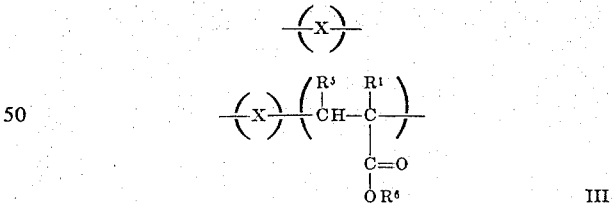

III and the fatty acid amide has the formula

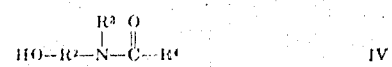

IV wherein the symbols used have the same meaning as given above.

An essential characteristic of the ultimate elastomeric polymer obtained by esterifying pendant $-COOH$ groups of the backbone by reaction with the unsaturated fatty acid hydroxyamide, as concerns caulks, is that there be less than about 10 percent, and more preferably less than about 5 percent, on a weight basis, of the groups represented by the formula:

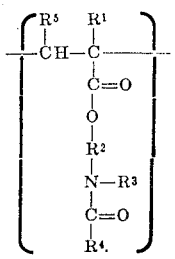

If this criterion is not observed, over a long period of time the caulk may become too brittle or hard for proper expansion and contraction of abutting surfaces in contact with a single caulk bead, or the bead may become so hard as to preclude easy repair. Without a silane of the type used in solvent-based caulks, wet adhesion on upright surfaces may be defective, especially if more than 5 percent of said groups by weight is present. For proper adhesion of the caulk and for other advantageous properties, it is essential to have free carboxyl groups along with the pendant ester amide groups.

The backbone polymer is a water-insoluble vinyl polymer containing the requisite proportion of carboxyl (—COOH) groups as described herein. The backbone polymers per se are well known in the art and form no part of the present invention.

The proportions of monomers in the backbone are such that there is at least 0.25 percent and no more than 40 percent, preferably less than 25 percent, of unsaturated carboxylic acid, by weight, in the monomers going into said backbone polymer. An especially preferred range is from about 1 percent to 5 percent, and the optimum is considered to be in the range of 1.5 percent to 3.5 percent. In reacting the hydroxyamide of the unsaturated fatty acid with free carboxyl (—COOH) groups in the backbone polymer, the mole ratio of —COOH:HO—$R^2$— is in the range of from 1:0.2 to 1:0.9, preferably from 1:0.3 to 1:0.7. A particularly useful range is from 1:0.4 to 1:0.6. It is essential to have a substantial proportion of free carboxyl groups for proper adhesion and, for maximum longterm flexibility necessary in the cured caulks, a minimum of the drying oil functionality.

In the backbone, hard monomers such as styrene or methyl methacrylate are useful in the range of 0 to 90 percent, preferably 5 to 25 percent, with soft monomers such as ethyl or butyl acrylate forming from about 75 percent to about 99.75 percent of the total monomers, preferably 70 to 94 percent.

The preferred backbone polymers are those of vinyl addition polymer type, including as an essential component the $\alpha,\beta$-unsaturated carboxylic acid, preferably acrylic acid or methacrylic acid. Other useful copolymerizable acids are named in U. S. Pat. Nos. 3,098,760 and 3,261,796, additional examples being given below.

To amplify, the unsaturated carboxylic acid may be a simple monocarboxylic acid, a polycarboxylic acid, or may be a partial ester or half amide of such $\alpha,\beta$-unsaturated polycarboxylic acids, and salts thereof with a volatile base such as ammonia, or with a volatile water-soluble amine such as dimethylamine, triethylamine, triethanolamine, morpholine, N-methyl morpholine, picoline, and the like. Examples of copolymerizable ethylenically unsaturated monocarboxylic or polycarboxylic acids are sorbic, acryloxyacetic, acryloxypropionic, cinnamic, vinyl furoic, $\alpha$-chlorosorbic, methacryloxypropionic, methacryloxyacetic, p-vinylbenzoic, acrylic, methacrylic, maleic, furmaric, aconitic, atropic, crotonic, and itaconic acid, or mixtures thereof, with itaconic acid and the $\alpha,\beta$-unsaturated monocarboxylic acids, particularly methacrylic acid and acrylic acid, being perferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid maleate. Such partial esters and partial amides are considered to be "$\alpha,\beta$-unsaturated monocarboxylic acids," and the term as used herein includes such esters and amides.

The term "vinyl monomer" as used herein means a monomer comprising at least one of the following groups:

whether homopolymerizable or not, giving units corresponding to X and to formula II. Examples are the $\alpha,\beta$-ethylenically unsaturated monocarboxylic acids and esters and amides thereof, $\alpha,\beta$-ethylenically unsaturated aldehydes, $\alpha,\beta$-ethylenically unsaturated dicarboxylic acids and esters, amides, half esters, and half amides thereof, $\alpha,\beta$-ethylenically unsaturated nitriles, hydrocarbons such as $\alpha$-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), vinyl amines and salts thereof, vinyl ureido monomers, vinyl compounds having heterocyclic nitrogen-containing (HN<) groups, and halogen, hydroxyalkyl, or aminoalkyl substituted derivatives thereof, whether homopolymers or copolymers. The vinyl polymers and methods for their preparation form no part of the present invention, and any such polymer may be treated in accordance with the present invention. For examples of well-known vinyl polymers and methods of preparing the same, see "Polymer Processes," Schildknecht, Interscience, N. Y. (1956), pp. 111–174. Mixtures of different polymers are useful.

Specific examples of suitable monomers which may be copolymerized to obtain the water-insoluble polymers for use according to the invention in addition to the unsaturated acid monomers and esters thereof with alkanols having one to 20 carbon atoms, such as methanol, ethanol, butanol, pentadecanol and the like, are acrolein, methacrolein, ethylene, propylene, isobutene, butadiene, isoprene, chloroprene, styrene, vinyltoluene, vinyl methyl ether, vinyl isobutyl ether, vinyl chloride, vinyl bromide, vinylidene chloride, vinyl sulfide, vinyl acetate, vinyl propionate, the vinyl pyridines, primary amino compounds such as $\beta$-aminoethyl vinyl ether, aminopentyl vinyl ether, secondary amino-containing compounds such as secondary amyl t-butyl amino ethyl methacrylate, tertiary amino-containing compounds such as t-dimethylaminoethyl methacrylate, and the allied amine salts such as the chloride or hydroxide, ureido monomers such as are disclosed in U. S. Pat. Nos. 2,881,155 to Hankins, 3,300,429 to Glavis and Keighly, and 3,356,627 to Scott, examples being β-ureidoethyl acrylate, β-(N,N'-ethyleneureido)ethyl acid maleate, β-ureidoethyl vinyl ether, N-vinyl-N,N'ethyleneurea, N-vinyloxyethyl-N,N'-ethylene-urea, N-methacrylamidomethyl-N,N'-ethyleneurea, and N-dimethylaminoethyl-N'vinyl-N,N'-ethyleneurea, β-hydroxyethyl methacrylate, N-hydroxyethylacrylamide, N-methylolacrylamide, and N-(dimethylaminoethyl)acrylamide. Copolymers, and graft, block, or segmented polymers are included. Conventional methods of obtaining the backbone polymers are utilized.

Preferred vinyl monomers in addition to the acid, include one or more of an ester of an α,β-unsaturated carboxylic acid, or, when those from which X is derived are used, an unsaturated nitrile, a vinyl halide, a vinylidene halide, a vinyl aromatic, a vinyl alcohol ester, or an unsaturated hydrocarbon.

As is described below, these vinyl monomers include the acids mentioned above and esters thereof, as well as known "soft" and "hard" monomers.

Another of the important, and at times essential monomers, in addition to the acid monomer, usually utilized in a substantial proportion to prepare the backbone polymer, is a resiliency-imparting or soft monomer which may be represented by the following formula:

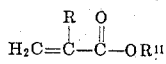

wherein R is H or alkyl having 1 to 4 carbon atoms and $R^{11}$ is the straight chain or branched chain radical of a primary or secondary alkanol, alkoxyalkanol or alkylthiaalkanol, and having up to about 14 carbon atoms, examples being ethyl, propyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl, ethylthiaethyl, methylthiaethyl, ethylthiapropyl, n-octyl, 6-methylnonyl, decyl, dodecyl, and the like, said radicals $R^{11}$, when alkyl, having from two to about 14 carbon atoms, preferably from three to 12 carbon atoms, when R is H or methyl. When R is alkyl and $R^{11}$ is alkyl, $R^{11}$ should have from about 6 to about 14 carbon atoms and when R is H and $R^{11}$ is alkyl, $R^{11}$ should have from about two to about 12 carbon atoms, in order to qualify as a soft monomer.

Other ethylenically unsaturated copolymerizable vinyl monomers, the homopolymers of which have a much higher Tg, are used in combinations with the above mentioned soft monomers provided they do not adversely affect the desired properties of the caulk (e.g., unduly raise the overall Tg). The "hard" acrylics may be represented by the formula:

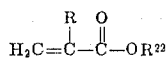

wherein R is as above. $R^{22}$ is preferably alkyl and is methyl or alkyl having from about 13 to about 20 carbon atoms when R is H, and is alkyl of from one to about five carbon atoms or alkyl of from about 15 to about 20 carbon atoms when R is methyl. It can be seen from above that for alkyl acrylates and alkyl methacrylates the Tg at first decreases with an increased chain length of the alkyl group and then the Tg again increases; i.e., both hard and soft monomers are known to occur in each group of monomers. Examples of these hard monomers and other hard monomers include: methyl acrylate, acrylamide, vinyl acetate, tetradecyl acrylate, pentadecyl acrylate, methyl methacrylate, ethyl methacrylate, t-butyl acrylate, butyl methacrylate, styrene, pentadecyl methacrylate, vinyl toluene, methacrylamide, and N-methylolacrylamide.

As is known, for a given number of carbon atoms in the alcohol moiety, the extent and type of branching markedly influences the Tg, the straight chain products giving the lower Tg.

As is apparent, an important property of the backbone polymer is the Tg thereof, and consequently the selection of monomers and proportions thereof depends upon their influence on the Tg. The Tg of the polymer must be below 10° C., preferably below 0° C. (i.e., it must give a rubbery product) and is more preferably below −10° C. The modified backbone polymer containing the pendant ester groups must also have the same Tg requirements. "Tg" is a conventional criterion of polymer hardness and is described by Flory, "Principles of Polymer Chemistry," pp. 56 and 57 (1953), Cornell University Press. See also "Polymer Handbook," Brandrup and Immergut, Sec. III, pp. 61–63, Interscience (1966). While actual measurement of the Tg is preferred, it may be calculated as described by Fox, Bull. Am. Physics Soc. 1, 3, p. 123 (1956). Examples of the Tg of homopolymers and the inherent Tg thereof which permits such calculations are as follows:

| Homopolymer of | Tg |
|---|---|
| n-octyl acrylate | −80° C. |
| n-decyl methacrylate | −60° C. |
| 2-ethylhexyl acrylate | −70° C. |
| n-butyl acrylate | −56° C. |
| octyl methacrylate | −20° C. |
| n-tetradecyl methacrylate | −9° C. |
| methyl acrylate | 9° C. |
| n-tetradecyl acrylate | 20° C. |
| t-butyl acrylate | 43° C. |
| methyl methacrylate | 105° C. |
| acrylic acid | 106° C. |

These or other monomers are blended to give the desired Tg of the copolymer.

The polymeric backbone is desirably obtained by solution polymerization of one or more of the ethylenically unsaturated acids with other unsaturated monomers including, among the more preferred vinyl monomers, the esters of acrylic acid or methacrylic acid with benzyl alcohol, phenol, or a saturated monohydric aliphatic alcohol, especially an alkanol, having one to 18 carbon atoms, such as cyclopentanol, cyclohexanol, methanol, ethanol, n-propanol, isopropanol, n-butanol, methoxyethanol, ethoxyethanol, methoxyethoxyethanol, ethoxy-ethoxyethanol, isobutanol, sec-butanol, tert-butanol, any of the pentanols, hexanols, octanols, decanols, dodecanols, hexadecanols, and octadecanols, bearing in mind the required Tg and acid monomer. Other preferred comonomers include acrylonitrile, methacrylonitrile, vinyl acetate, styrene, vinyl toluene (o, m, or p), vinyl chloride or vinylidene chloride, to give the X in the foregoing formula. Blends of copolymers may be used.

High molecular weight polymers, e.g., 10,000 to several million, obtained by emulsion or solution polymerization or other methods, and of water-insoluble character when in acid form, are used as the backbone polymer. Preferably, the backbone polymer has a molecular weight of 10,000 to 600,000 or more.

The substrates with which the invention is concerned are of all types, including siliceous substrates such as glass sheets, fiberglass textiles, asbestos sheets, asbestos cement products, concrete, stone, stucco, slate, sandstone, granite, ceramics, and porcelain; also fiber reinforced plastic articles such as canoes, boathulls, or other formed articles made out of fiber-glass reinforced polyesters or other plastic materials; metals such as aluminum, steel, iron, brass; wood and other structural materials; metal oxide layers such as those of aluminum oxide and iron oxide; leather; textiles of cellulose such as of cotton, linen, silk, wool, rayon, cellulose esters such as cellulose acetate, nylons, polyesters such as polyethylene glycol terephthalate, acrylonitrile polymers, vinylidene chloride polymers and other vinyl or acrylic ester polymers; films, pellicles, sheets and other shaped articles of various plastic systems such as of cellulose ethers or esters including hydroxyethyl cellulose, methyl cellulose, cellulose acetate, cellulose acetate butyrate, polyesters such as polyethylene glycol terephthalate, nylons, vinyl choride or vinylidene chloride polymers and copolymers, methyl methacrylate polymers and copolymers, aminoplast or phenoplast resin, organopolysiloxane resins or rubber.

The caulks of the present invention are particularly valuable in that they can be used directly on any of the substrates without the need of a priming coat.

The solvents used in the polymerization may be such organic solvents as benzene, toluene, xylene, solvent naphthas of aliphatic, aromatic, or naphthenic type, such as mineral spirits, acetone, dioxane, etc. Of course, other modes of polymerization can be used. The amount of solvent in the final caulk is from 0 percent to 30 percent based on total weight. Preferably, it is from 5 percent to 15 percent.

The fillers are present in an amount of from 10 percent to 90 percent by weight of the total solids in the composition depending upon the consistency desired, the presence or absence of thickening agents, the amount and identity of solvent utilized, and so forth. Suitable fillers include calcite, limestone, mica, talc, asbestos fiber or powder, diatomaceous earth, barytes, alumina, slate flour, calcium silicate, clay, colloidal silica, magnesium carbonate, magnesium silicate, and so on. The amounts of solvent, if any, filler, and polymer solids are such as to give the caulking composition a dough-like consistency.

Among the drying oils from which the drying oil fatty acid amide is derived are linseed, tung, tall, safflower, isano, soya, dehydrated castor, maleinized or fumarized linseed, oiticica, palm, peanut, corn, walnut, menhaden, dehydrogenated castor, and cottonseed oils, and similar oils, as well as acids not derived from drying oils and of a synthetic origin, with a carbon chain preferably of about 20 carbon atoms or less and having unsaturation therein which can be caused to air cure in a manner analogous to linseed oil. The preferred oils are those which contain oleic and linoleic acids or linoleic and linolenic acids as the predominant ones.

The preparation of the fatty acid hydroxyamide is carried out by well-known procedures as is the esterification of the carboxyl groups on the polymeric backbone by the hydroxyamide. Exemplary of publications describing these are The Journal of the American Oil Chemists' Society, Volume 46, pages 355–364, published in 1969, which discloses the use of diethanolamine to produce fatty acid hydroxyamide rather than the monoethanolamine which is preferred in the present invention, German Pat. 1,940,471, and Belgian Pat. 757,271 and U.S. Pat. 3,590,016, the latter two relating to hard coatings such as paints. The U.S. and Belgian patents are to the same type of polymer generally, although the products taught therein have several defects making them unsuitable for many uses including caulking or sealing compositions. For example, all of the backbone polymers disclosed are brittle or hard polymers. Thus, it appears that the softest polymer backbone, of the patent examples, would be of styrene and/or methyl methacrylate that would have a glass transition temperature (Tg) of 100° C. or above. Polymers of this hardness, at ambient temperatures, would be useless for caulks or sealants, even if extensively plasticized.

Any of the conventional driers, such as the linoleates, naphthenates, and resinates of cobalt, zirconium, manganese, lead, cerium, chromium, iron, nickel, uranium, and zinc are suitable.

The amount of drier based on the weight of the hydroxyamide of formula IV can be as low as 0.05 percent to as high as 3 percent or more. Best results are obtained with combinations of driers, particularly zinc naphthenate and cobalt naphthenate in quite small amounts, for example, from .05 percent to 0.5 percent of the zinc naphthenate together with 0.01 percent to 0.1 percent cobalt naphthenate are particularly useful. The amount of drier utilized should be such as to minimize dirt pickup by the finished caulk.

It is helpful, in some cases, to utilize a silane to improve wet adhesion to glass by the caulk and also, at times, to utilize plasticizers for providing low temperature flexibility, for example, at $-15°$ F. Suitable silanes include vinyltriethoxysilane, $\gamma$-methacryloxypropyltrimethoxysilane, $\gamma$-mercaptopropyltrimethoxysilane, $\gamma$-glycidoxypropyl-trimethoxysilane, $\beta$-(3,4-epoxycyclohexyl)ethyltrimethoxysilane, $\gamma$-aminopropyltriethoxysilane, and N-(dimethoxymethylsilylisobutyl)ethylenediamine. The silane concentration may be between about 0.05 percent and 0.5 percent. Higher amounts may be used but do not result in proportional improvements in adhesion. Suitable plasticizers include oil-modified sebacic acid alkyds, unmodified sebacic acid alkyds, oil-modified maleic polyesters, etc. It is preferred to use "internal" plasticization by means of soft monomers in the backbone; this provides a product which can be used with less solvent, thus minimizing shrinkage.

To assist those skilled in the art to practice the present invention, the following modes of operation are suggested by way of illustration, parts and percentages being by weight and the temperature in °C. unless otherwise specifically noted.

1. A glass-block window is mounted in a wood frame within an opening in a stone wall of a house. The joint between the wood frame and the stone wall and the joint between the peripheral edge of the glass-block assembly and the wood frame are filled with the caulking composition to be tested. Aluminum-glass joints are also caulked. It is then aged and weathered. Accelerated tests are conducted in the laboratory at elevated temperatures.

EXAMPLE 1

PREPARATION OF COPOLYMER BACKBONE

Apparatus is provided equipped with a stirrer, thermometer, inlet and outlet tubes for gas, and a device for admitting reactants. The apparatus is swept with nitrogen and a slow current of this gas is maintained during the polymerization cycle. There are charged to this apparatus 366.0 parts of xylene which is heated to 140° C. At this reaction temperature, a mixture of 2267.0 parts of butyl acrylate, 425.0 parts of methyl methacrylate, 70.6 parts of acrylonitrile, 70.6 parts of methacrylic acid, 148.0 parts of xylene, and 4.14 parts of a 75 percent solution of t-butyl peracetate in mineral spirits is added over a five hour period. Subsequently there is added 3.76 parts of t-butyl peracetate and 26.0 parts of xylene over a thirty minute period. The reaction is held at 140° C. for an additional one hour to complete the process. The product is a clear, yellow solution having an approximate viscosity of 120,000 cps. Brookfield at 25° C., at approximately 83.0 percent solids. The monomer ratios used are:

| methyl methacrylate | 15 parts |
|---|---|
| butyl acrylate | 80 parts |
| acrylonitrile | 2.5 parts |
| methacrylic acid | 2.5 parts |

EXAMPLE 2

PREPARATION OF N-METHYL-N-(2-HYDROXYETHYL)-LINDSEED OIL FATTY ACID AMIDE

To an apparatus which is described in Example 1 above there are charged 1320.0 parts of linseed oil, 506.3 parts of N-methylethanol amine, and 3.05 parts of sodium methylate. The mixture is heated for two and one-half hours at 115° C. To remove the low boiling volatiles, the reaction is held at 115° C. and the pressure is reduced to 5 to 10 mm. Hg. for 15 minutes. The reaction mixture is cooled to room temperature, diluted with 1700.0 parts of xylene, and extracted three times with 600 parts of an aqueous solution containing 15 percent NaCl. The product is then dried and concentrated via azeotropic distillation under reduced pressure, 50 to 115° C./190 to 210 mm. Hg., to an approximate assay of 60 percent N-methyl-N-(2-hydroxyethyl)linseed oil fatty acid amide in xylene.

EXAMPLE 3

COREACTION OF COPOLYMER WITH N-METHYL-N(2-HYDROXYETHYL)-LINSEED OIL FATTY ACID AMIDE

To an apparatus which is described in Example 1 above there are charged 3070.5 parts of the copolymer solution of Example 1 and 209.2 parts of N-methyl-N(2-hydroxyethyl)-linseed oil fatty acid amide solution described above. The reaction mixture is heated and maintained at reflux, 149 to 163° C., with the continuous removal of water via xylene displacement, which takes approximately one and three-quarter hours. After solvent adjustment to approximately 83.0 percent solids, the oil modified polymer has a viscosity, Brookfield 25° C., in the range of approximately 100,000 cps.

EXAMPLE 4

A coreaction product is prepared according to Example 3 from the following reaction charge: 3087.0 parts of the copolymer solution of Example 1 and 441.0 parts of N-methyl-N-(2-hydroxyethyl)linseed oil fatty acid amide solution.

EXAMPLE 5

A typical formulation for preliminary thin film evaluation prior to further evaluation as caulks is as follows:

| | Parts |
|---|---|
| Oil modified polymer (83.0% solids) | 194.0 |
| Pine Oil No. 230[a] | 2.0 |
| Ethylene glycol | 3.4 |
| CaCO$_3$ | 150.0 |
| Ultrasbestos (floor tile grade)[b] | 6.0 |
| Texas Talc No. 2619[c] | 34.0 |
| Cab-O-Sil M-5[d] | 10.0 |
| Xylene | 320.0 |
| Cobalt naphthenate (6%) | (1.0% Co++ based on oil)* |

[a] The Glidden Company
[b] Johns-Manville
[c] Whittaker, Clark and Daniels, Inc.
[d] Cabot Corporation, collidal silica
* "Oil" here means the amount by weight of amide of formula IV used.

A. The following results are obtained with the formulation, using the oil modified polymer of Example 3, cast into 10-mil test sheets which are exposed to atmospheric air for one week at room temperature.

| Tensile | 97.7 psi |
|---|---|
| Elongation | 181.0 percent |
| Elastic Recovery | 100.0 percent |

B. When the same 10-mil test sheet is exposed to hot air at 90° C. for 16 hours, rather than air drying at ambient temperature, the results are as follows:

| Tensile Strength | 132 psi |
|---|---|
| Elongation | 107.0 percent |
| Elastic Recovery | 93.2 percent |

C. Repeating A) but using the oil-modified polymer of Example 4 gives the following results:

| Tensile Strength | 154 psi |
|---|---|
| Elongation | 88.0 percent |
| Elastic Recovery | 98.8 percent |

D. Repeating B) but with the modified polymer of Example 4 gives the following values:

| Tensile Strength | 230 psi |
|---|---|
| Elongation | 70.0 percent |
| Elastic Recovery | 96.9 percent |

EXAMPLE 6

A useful formulation for caulks is:

| | Parts |
|---|---|
| Oil modified polymer (83.0% solids) | 2336.0 |
| Pine Oil No. 230 | 24.0 |
| Ethylene glycol | 40.0 |
| CaCO$_3$ | 1800.0 |
| Ultrasbestos (floor tile grade) | 72.0 |
| Texas Talc No. 2619 | 408.0 |
| Cab-O-Sil M-5 | 10.0 |
| Zinc naphthenate (8%) | (1.0% Zn++ based on oil) |
| Cobalt naphthenate (6%) | (0.15% Co++ based on oil) |

A. The following results are obtained for the above caulk formulation using the oil-modified polymer of Example 3 the caulk cast into one-fourth inch thick test strips and exposed to hot air at 90° C. for one week.

| Tensile Strength | 32.6 psi |
|---|---|
| Elongation | 231.0 percent |
| Elastic Recovery | 90.0 percent |
| Shore A Hardness | 42.0 |

B. The following results are achieved using the above caulk formulation using the oil-modified polymer of Example 4 cast into one-fourth inch thick test strips and exposed to hot air at 90° C. for one week.

| | |
|---|---|
| Tensile Strength | 36.4 psi |
| Elongation | 236.0 percent |
| Elastic Recovery | 99.5 percent |
| Shore A Hardness | 40.0 |

EXAMPLE 7

Another typical caulk formulation is:

| | Parts |
|---|---|
| Polymer (83% total solids) | 2336 |
| Pine Oil No. 230 | 24 |
| Ethylene glycol | 40 |
| CaCO$_3$ | 1800 |
| Ultrasbestos floor tile grade | 72 |
| Texas Talc No. 2619 | 408 |
| Cab-O-Sil M-5 | 120 |
| Cobalt naphthenate (6%) | 2.4 |
| Zinc Naphthenate (8%) | 12.1 |
| Xylene | 216 |

Similar results to those of the foregoing examples are obtained.

I claim:

1. A caulking compound having a dough-like consistency comprising about 10 percent to 80 percent by weight, solids basis, of an addition polymer backbone of ethylenically unsaturated monomers, one of which is an unsaturated carboxylic acid monomer, modified by having pendant ester-amide groups, the polymer having units of the following structure:

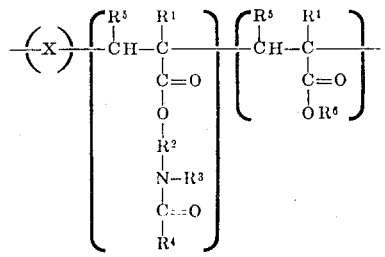

wherein $R^1$ is H, a lower alkyl radical having one to about five carbon atoms, halogen, —CH$_2$COOR, —COOR, or —CH$_2$COOH, R being a lower alkyl radical having from one to 8 carbon atoms;

$R^2$ is an alkylene radical having from two to 18 linear carbon atoms between the nitrogen and oxygen atoms;

$R^3$ is H, or a lower alkyl radical having from one to 8 carbon atoms;

$R^4$ is an unsaturated, air curable alkyl radical;

$R^5$ is H, —COOH, —CONH$_2$, or —COOR, wherein R is as above;

$R^6$ is H, or at least one lower alkyl radical having from one to 8 carbon atoms, at least a portion of $R^6$ being H to give free —COOH groups; and X is derived from at least one vinyl monomer and is optional;

the units in parentheses being in any order, which polymer is derived from the esterification of some of the carboxylic groups in said backbone by at least one un- saturated fatty acid hydroxyamide, the amount of said unsaturated carboxylic acid in the backbone being from 0.25 to 40 weight percent on the basis of copolymerized monomers, the molar ratio of free-carboxyl groups, in the backbone prior to said esterification, to hydroxyamide groups being from about 1:0.9 to 1:0.2, and 20 percent to 90 percent by weight, solids basis, of a filler, no more than about 10 percent by weight of the units having the formula:

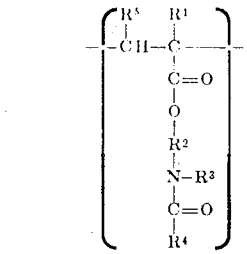

being present in the modified polymer, and in which the Tg of the backbone polymer free of pendant ester groups is below about 10° C.

2. The composition of claim 1 in which $R^5$ is H, $R^1$ is H or a lower alkyl radical, $R^3$ is methyl, $R^4$ has about 18 carbon atoms or less, the amount of said unsaturated carboxylic acid is from 1 to 5 weight percent of the backbone monomers, no more than about 5 percent by weight of the units having the formula:

being present in the modified polymer, said ratio is from 1:0.7 to 1:0.3, and the polymer is a rubbery material.

3. The composition of claim 2 in which $R^1$ is H or methyl, $R^2$ has 2 to 3 linear carbon atoms between the nitrogen and oxygen atoms, said ratio is 1:0.6 to 1:0.4, and the Tg of the backbone polymer free of pendant ester groups is below about 0° C.

4. The composition of claim 3 in which said Tg is below −10° C.

5. The composition of claim 1 in which an organic solvent is present, and the polymer is predominantly an ester of acrylic acid and an alkanol having one to four carbon atoms, with, in smaller amounts, an ester of methacrylic acid and an alkanol having one to four carbon atoms, methacrylonitrile or acrylonitrile, and methacrylic acid or acrylic acid.

6. The composition of claim 2 in which an organic solvent is present, and the polymer is predominantly an ester of acrylic acid and an alkanol having one to four carbon atoms, with an ester of methacrylic acid and an alkanol having one to four carbon atoms, methacrylonitrile or acrylonitrile, and methacrylic acid or acrylic acid being present in smaller amounts.

7. The composition of claim 4 in which said fatty acids are predominantly at least one of oleic, linoleic, or linolenic acid.

8. The composition of claim 6 containing a silane selected from the group consisting of vinyltriethoxysilane, γ-methacryloxypropyl-trimethoxysilane, γ-mercaptopropyltrimethoxysilane, γ-glycidoxy-propyltrimethoxysilane, β-(3,4-epoxycyclohexy)ethyltrimethoxysilane, γ-aminopropyltriethoxysilane, and N-(dimethoxymethyl-silylisobutyl)ethylenediamine.

9. The composition of claim 1 in which the backbone polymer is derived from monomers including 0 to 90 percent hard monomers and 75 percent to 99.75 percent soft monomers.

* * * * *

UNITED STATES PATENT OFFICE
CERTIFICATE OF CORRECTION

Patent No. 3,759,915      Dated September 18, 1971

Inventor(s) Roger H. Kottke

It is certified that error appears in the above-identified patent and that said Letters Patent are hereby corrected as shown below:

Column 2, line 46, above the formula, delete "—(— X —)—"

Column 3, line 31, "per se" should read --<u>per se</u>--

Column 4, line 27, "$CH_2$" should read --$CH_2=C\!<$--

Column 4, line 68, "amino ethyl" should read --aminoethyl--

Column 10, line 19, "collidal" should read --colloidal--

Signed and sealed this 16th day of April 1974.

(SEAL)
Attest:

EDWARD M. FLETCHER, JR.          C. MARSHALL DANN
Attesting Officer                  Commissioner of Patents RAD:vlp